Nov. 28, 1933.　　　　W. L. INGRAM　　　　1,937,038
AUTOMATIC RELIEF VALVE
Filed Feb. 18, 1929
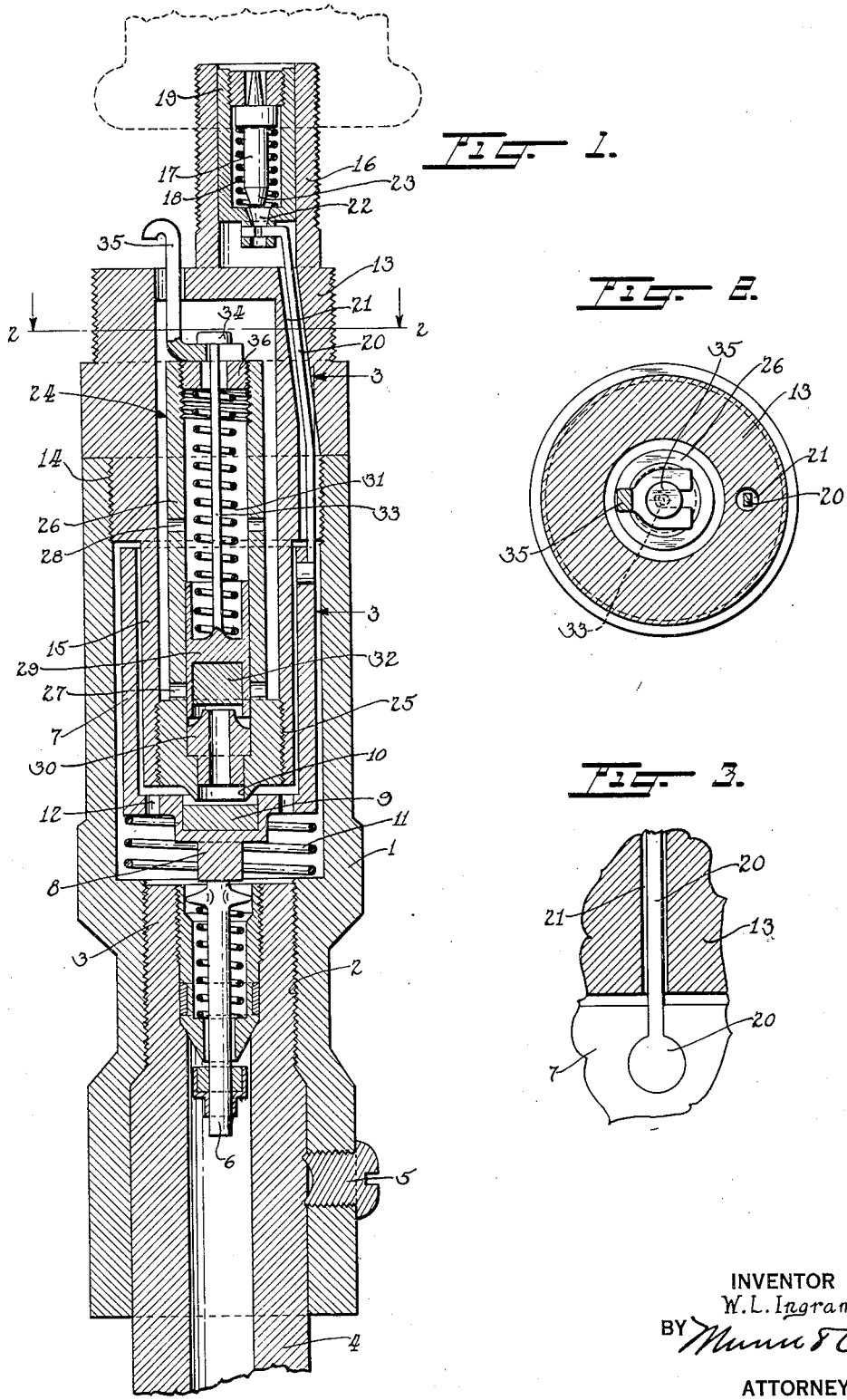
INVENTOR
W. L. Ingram
BY
ATTORNEYS Patented Nov. 28, 1933

1,937,038

UNITED STATES PATENT OFFICE 1,937,038

AUTOMATIC RELIEF VALVE

Walter L. Ingram, Chicago, Ill., assignor of one-half to Franklin W. Ingram, Chicago, Illinois Application February 18, 1929. Serial No. 340,979

1 Claim. (Cl. 152—11.5)

My invention relates to improvements in automatic relief valves, and it consists in the combinations, constructions, and arrangements herein described and claimed.

An object of my invention is to provide an automatic relief valve which may be attached to any member that is arranged to receive air or the like under pressure but which is especially adapted to be attached to a valve stem of an ordinary vehicle tire.

A further object of my invention is to provide a device of the type described which has a certain portion of a structure which may be employed in combination with devices or members receiving air of any desired pressure.

A further object of my invention is to provide a device of the type described in which the pressure determining means may be formed in a unit and these units vary according to the pressure desired.

A further object of my invention is to provide a device of the type described which has novel means for manually releasing the relief valve prior to the applying of air under pressure to the device.

A further object of my invention is to provide a device of the type described which has novel means for opening the valve in the valve stem of the vehicle tire as air under pressure is forced through the device.

Other objects and advantages will appear in the following specification, and the novel features of the invention will be particularly pointed out in the appended claim.

My invention is illustrated in the accompanying drawing forming part of this application, in which Figure 1 is a longitudinal sectional view of my device as applied to a valve stem of a vehicle tire, Figure 2 is a section along the line 2—2 of Figure 1, and Figure 3 is a section substantially along the line 3—3 of Figure 1.

In carrying out my invention I provide a casing 1 which has an internal threaded portion 2 arranged to receive a threaded neck 3 of a valve stem 4. A set screw 5 is carried by the casing 1 for rigidly securing the casing to the valve stem 4. An ordinary valve 6 is disposed in the valve stem 4.

A valve actuating collar 7 is movably disposed in the casing 1 and is provided with a projection 8 which is disposed in engagement with the valve 6. An auxiliary valve 9 is carried by the collar 7 and is normally held in engagement with a valve seat 10 by means of a spring 11. A plurality of openings 12 is disposed in the collar 7 around the valve 9.

A housing 13 is disposed in the casing which is rigidly secured in place by means of the threaded connection 14. The housing 13 is provided with a reduced portion 15 which is disposed in the collar 7. An offset portion 16 is integral with the housing 13 and has an actuating valve 17 disposed therein. The valve 17 is normally held closed by means of a spring 18 which is disposed concentric with the valve.

The valve 17 and the spring 18 are encased in a sleeve 19 which is slidably disposed in the offset portion 16. The sleeve 19 is connected to the collar 7 by means of a push rod 20. The push rod 20 is movably disposed in a passageway 21 in the housing 13. A tapered outlet opening 22 is provided for the sleeve 19 and is arranged to receive the tapered end 23 of the valve 17.

A pressure limiting unit 24 is disposed in the housing 13 and secured in place by means of the threaded connection 25. The unit 24 is composed of a tubular casing member 26 which has groups of spaced-apart openings 27 and 28. A piston valve 29 disposed in the tubular casing 26 is normally held in engagement with its valve seat 30 by means of a compression spring 31. The compression spring 31 may vary in size dependent upon the amount of air under pressure desired to be disposed in the tire. The piston valve 29 has a sealing cushion 32 which is spaced inwardly from the edge of the piston. A valve stem 33 is provided for the piston valve 29, and extends through the tubular portion 26. An enlarged head portion 34 is provided for the valve stem 33. A lifting rod 35 is operatively connected to the valve stem 33 for a purpose hereinafter described. The valve seat 10 is integral with the tubular casing 26.

From the foregoing description of the various parts of the device, the operation thereof may be readily understood. Let us assume that the operator wishes to fill the tire with the desired amount of air under pressure. In order to allow only the desired amount of air to pass into the tire, the operator should first lift the rod 35 which will move the piston valve 29 from its seat 30. Then by releasing the rod 35 the operator may apply the air hose to the reduced portion 16. The purpose of first lifting the valve 29 is to allow this valve to be actuated when the desired amount of air has passed into the tire. Valves of this nature sometimes stick and require an unusual amount of pressure to actuate them.

Upon placing the air hose in connection with the offset portion 16, the valve 17 will be opened and at the same time the sleeve 19 will be moved downwardly a sufficient distance to force the push rod 20 together with the collar 7 downwardly so as to open the valve 6. The air from the air hose will then be allowed to pass around the valve 17, through the opening 22, the passageway 21, between the collar 7 and the reduced portion 15 of the housing, through the openings 12, around the valve 6, and into the tire through the valve stem 4. When the collar 7 has been moved outwardly against the tension of the spring 11, the relief valve 9 will be moved away from the valve seat 10 allowing the air under pressure to engage with the piston valve 29. When the predetermined amount of air under pressure has passed into the tire, the piston valve 29 will be moved against the tension of the spring 31 a sufficient distance to allow the excess air under pressure to pass through the openings 27, and out into the atmosphere through the housing 13. The rapid opening of the piston valve 29 and the rapid escapement of the excess air will create a sound which will warn the operator that the desired amount of air under pressure has passed into the tire.

By removing the air hose the spring 18 will move the valve 17 to a closed position and the spring 11 will move the collar 7 upwardly so as to close the relief valve 9. The upward movement of the collar 7 will also impart an upward movement to the push rod 20 and the sleeve 19.

In order to change the device so that it may be applied to a tire requiring a greater or a lesser amount of air under pressure, the unit 24 may be removed and another unit containing a spring of greater or lesser tension may be disposed in the housing. During the operation of the device, it may be observed that after the piston valve 29 has been opened the excess air under pressure may also pass into the tubular member 26 through the openings 28 thus forcing the lifting rod 35 upwardly. This is another means of indicating to the operator when the desired amount of air under pressure has been disposed in the tire.

When the air hose is placed in connection with the offset portion 16 the sleeve 19, as well as the valve 17, is moved downwardly either by an ordinary plunger carried by the air hose, or by the pressure of the air passing from the air hose. The tapered end 23 of the valve 17 will be moved into the tapered opening 22 thus limiting the passage of air under pressure therethrough.

The tension of the spring 31 may be varied by the movement of the adjusting plug 36. This plug may be adjusted by means of a screwdriver or the like, and may be crimped in place when the desired adjustment is made.

I claim:

In a device of the character described, a body having a coupling at one end adapted to secure the body to a valve stem and an inlet member at the other end adapted to be connected to an air supply hose, said body comprising with a casing and a housing, said casing being formed with a bore extending from one end to the other, said housing being threaded into one end of said bore, said housing being provided with a tubular extension from said inlet member, said housing having a passageway extending from the tubular extension to said bore, a valve structure having a sleeve slidingly mounted in said extension, a rod secured to said sleeve extending through said passageway, a tubular member open at one end and secured at its open end to said rod, said tubular member being positioned in said bore, said tubular member being formed at the opposite end with a closure valve on one face and a valve opening member on the other face adapted to open a valve in said valve stem when said closure valve has been moved to a predetermined position, a spring tending at all times to close said closure valve, a relief valve positioned in said housing, the position of said relief valve being such that said closure valve will shut off said relief valve and prevent the same from functioning when the closure valve is in one position, said closure valve being adapted to be opened by said rod when said air supply hose has been applied and caused to move said sliding sleeve.

WALTER L. INGRAM.

CERTIFICATE OF CORRECTION.

Patent No. 1,937,038. November 28, 1933.

WALTER L. INGRAM.

It is hereby certified that error appears in the printed specification of the above numbered patent requiring correction as follows: Page 2, line 93, the claim, strike out the word "with"; and that the said Letters Patent should be read with this correction therein that the same may conform to the record of the case in the Patent Office.

Signed and sealed this 13th day of February, A. D. 1934.

F. M. Hopkins (Seal)  Acting Commissioner of Patents.